(12) United States Patent
Graves et al.

(10) Patent No.: US 10,781,909 B2
(45) Date of Patent: Sep. 22, 2020

(54) WINDAGE TRAY FOR ADVANCED LUBRICATION AND ENHANCED PERFORMANCE

(71) Applicant: Tesla, Inc., Palo Alto, CA (US)

(72) Inventors: Scott Michael Graves, Felton, CA (US); Diego Alberto Silva Rodriguez, Cupertino, CA (US)

(73) Assignee: Tesla, Inc., Palo Alto, CA (US)

( * ) Notice: Subject to any disclaimer, the term of this patent is extended or adjusted under 35 U.S.C. 154(b) by 0 days.

(21) Appl. No.: 15/944,918

(22) Filed: Apr. 4, 2018

(65) Prior Publication Data
US 2019/0003570 A1    Jan. 3, 2019

Related U.S. Application Data

(60) Provisional application No. 62/527,921, filed on Jun. 30, 2017.

(51) Int. Cl.
*F16H 57/04*    (2010.01)
*H02K 7/116*    (2006.01)
(Continued)

(52) U.S. Cl.
CPC .......... *F16H 57/0409* (2013.01); *B60K 1/00* (2013.01); *B60K 17/043* (2013.01);
(Continued)

(58) Field of Classification Search
CPC ............ F16H 57/0409; F16H 57/0402; F16H 57/0412; F16H 57/0423; F16H 57/0424; F16H 57/0427; F16H 57/0436; F16H 57/0457; F16H 57/046; F16H 57/0471; F16H 57/0482; F16H 57/0483; B60K 1/00; B60K 17/043; B60K 1/02; B60K 17/04;
(Continued)

(56) References Cited

U.S. PATENT DOCUMENTS

| | | |
|---|---|---|
| 4,269,295 A | 5/1981 | Kish |
| 4,607,180 A | 8/1986 | Stoody |
| (Continued) | | |

FOREIGN PATENT DOCUMENTS

| | | |
|---|---|---|
| CN | 203831276 | 9/2014 |
| GB | 162552 | 5/1921 |
| (Continued) | | |

*Primary Examiner* — Thomas C Diaz
(74) *Attorney, Agent, or Firm* — Knobbe, Martins, Olson & Bear, LLP

(57) ABSTRACT

A gear box and method of providing oil through the same is provided. The gear box includes a windage tray that includes a tray having a bleed hole therein, and another tray having another second bleed hole therein. Oil is provided through the bleed holes to respective gears situated in the trays. The windage tray may also include a magnet positioned within a magnet slot of the windage tray, for removing debris from the oil. A tube may also be attached to the windage tray, which tube can include a bleed hole therein, for spraying the oil out of the tube and towards a differential, for example. The windage tray and tube can be made from molded plastic, and can be made using the same mold. The gear box housing may further define a drain in an inner side wall to provide oil to a differential bearing, for example.

20 Claims, 11 Drawing Sheets

(51) Int. Cl.
*B60K 1/00* (2006.01)
*B60K 17/04* (2006.01)
*F16C 25/08* (2006.01)
*H02K 7/00* (2006.01)
*H02K 7/04* (2006.01)
*H02K 7/08* (2006.01)
*H02K 15/16* (2006.01)
*H02K 1/20* (2006.01)
*H02K 9/193* (2006.01)
*F16H 57/032* (2012.01)
*F16H 57/02* (2012.01)
*F16H 57/037* (2012.01)
*H02K 9/19* (2006.01)
*B60K 1/02* (2006.01)

(52) U.S. Cl.
CPC ....... *F16C 25/083* (2013.01); *F16H 57/0402* (2013.01); *F16H 57/046* (2013.01); *F16H 57/0412* (2013.01); *F16H 57/0423* (2013.01); *F16H 57/0424* (2013.01); *F16H 57/0427* (2013.01); *F16H 57/0436* (2013.01); *F16H 57/0457* (2013.01); *F16H 57/0471* (2013.01); *F16H 57/0482* (2013.01); *F16H 57/0483* (2013.01); *H02K 1/20* (2013.01); *H02K 7/003* (2013.01); *H02K 7/04* (2013.01); *H02K 7/083* (2013.01); *H02K 7/116* (2013.01); *H02K 9/193* (2013.01); *H02K 15/165* (2013.01); *B60K 1/02* (2013.01); *B60K 17/04* (2013.01); *B60K 2001/001* (2013.01); *B60Y 2200/91* (2013.01); *B60Y 2306/03* (2013.01); *B60Y 2306/05* (2013.01); *B60Y 2410/1022* (2013.01); *F16C 2326/06* (2013.01); *F16H 57/037* (2013.01); *F16H 2057/02034* (2013.01); *F16H 2057/0325* (2013.01); *H02K 7/006* (2013.01); *H02K 9/19* (2013.01)

(58) Field of Classification Search
CPC ........ F16C 25/083; H02K 1/20; H02K 7/003; H02K 7/04; H02K 7/083; H02K 7/116; H02K 9/193; H02K 15/165
See application file for complete search history.

(56) References Cited

U.S. PATENT DOCUMENTS

| | | | | |
|---|---|---|---|---|
| 5,251,725 | A * | 10/1993 | Barrett, Jr. | F16H 57/0456 184/6.14 |
| 5,899,574 | A | 5/1999 | Chujo | |
| 6,123,338 | A | 9/2000 | Edelmann | |
| 6,158,898 | A | 12/2000 | Jeng | |
| 6,507,134 | B1 | 1/2003 | Severien | |
| 6,938,731 | B2 * | 9/2005 | Slesinski | F16H 57/0421 184/11.1 |
| 7,374,507 | B2 * | 5/2008 | Corless | F16H 57/0483 184/6.12 |
| 9,052,009 | B2 * | 6/2015 | Barillot | F16H 57/0409 |
| 9,810,311 | B1 * | 11/2017 | Zhang | F16H 57/0423 |
| 9,822,869 | B1 | 11/2017 | Carr | |
| 10,208,848 | B2 * | 2/2019 | Hotait | F16H 57/0423 |
| 10,510,195 | B2 | 12/2019 | Patil et al. | |
| 2004/0130224 | A1 | 7/2004 | Magi | |
| 2004/0134693 | A1 | 7/2004 | Yamagishi | |
| 2005/0045393 | A1 | 3/2005 | Mizutani | |
| 2006/0062505 | A1 | 3/2006 | Hoefs | |
| 2009/0102298 | A1 | 4/2009 | Savant | |
| 2009/0127954 | A1 | 5/2009 | Mogi | |
| 2009/0212649 | A1 | 8/2009 | Kingman | |
| 2010/0187954 | A1 | 7/2010 | Kendall | |
| 2012/0096968 | A1 * | 4/2012 | Kawamoto | F16H 57/0409 74/467 |
| 2013/0293040 | A1 | 11/2013 | Chamberlin | |
| 2014/0027238 | A1 | 1/2014 | Schlaufman | |
| 2014/0056733 | A1 | 2/2014 | Ojima | |
| 2014/0147306 | A1 | 5/2014 | Yamashita | |
| 2014/0284183 | A1 | 9/2014 | Wolters | |
| 2014/0364263 | A1 | 12/2014 | Tokunaga | |
| 2015/0082929 | A1 | 3/2015 | Lsomura | |
| 2016/0311306 | A1 | 10/2016 | Sugiyama | |
| 2017/0096058 | A1 | 4/2017 | Kanada | |
| 2018/0259060 | A1 * | 9/2018 | Poster | F16H 57/0423 |
| 2018/0278126 | A1 | 9/2018 | Goldstein | |
| 2019/0003526 | A1 | 1/2019 | Graves | |
| 2019/0267869 | A1 | 8/2019 | Soma | |

FOREIGN PATENT DOCUMENTS

| | | | | |
|---|---|---|---|---|
| GB | 1426352 A | * | 2/1976 | ......... F16H 57/0457 |
| WO | WO 16/04670 | | 12/2016 | |

* cited by examiner

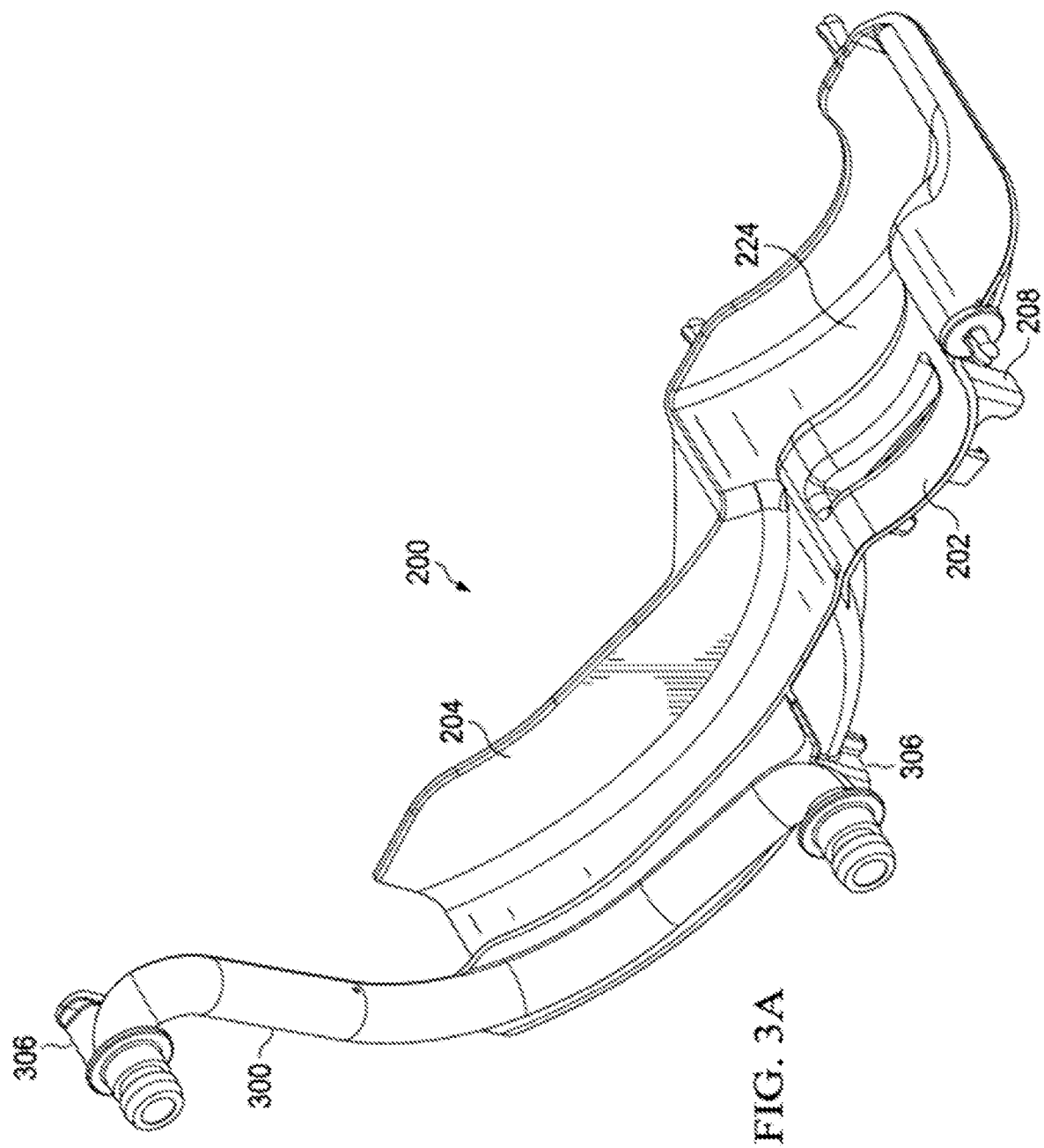

WINDAGE TRAY FOR ADVANCED LUBRICATION AND ENHANCED PERFORMANCE

CROSS-REFERENCE TO RELATED APPLICATION

The present U.S. Utility patent application claims priority pursuant to 35 U.S.C. § 119(e) to U.S. Provisional Application No. 62/527,921, entitled "ELECTRIC DRIVE UNIT", filed Jun. 30, 2017, which is hereby incorporated herein by reference in its entirety and made part of the present U.S. Utility patent application for all purposes.

The present application is related to U.S. Utility patent application Ser. No. 15/637,313, entitled "SYSTEM AND METHOD FOR MONITORING STRESS CYCLES," filed Jun. 29, 2017, which is incorporated by reference in its entirety.

BACKGROUND

Technical Field

The present invention relates to lubricating power transmission devices, and more particularly to a windage tray to aid lubrication and functioning of a drive unit, such as an electric-vehicle drive unit.

Description of Related Art

Lubricating of electric vehicle components is vital to increase efficiency and range of the electric vehicle. A lack of lubrication efficiency translates to loss of vehicle range given the sized power source, or alternatively, an increase in system weight and system cost if compensating for the decreased range by adding increasing the number of batteries. Further, a lack of lubrication can also manifest itself through parts coming in direct contact with one another resulting in metal shavings. Conversely, including too much lubrication, such as too much oil around rotating gears in an electric vehicle, can negatively impact performance and efficiency. For example, in the case of the rotating gears, if too much oil is present, it may cause increase drag and decrease the efficiency of the electric vehicle. Consideration must also be given to the design lubrication parts for manufacturing and assembly purposes, bearing in mind variations in the arrangement of cooperating components from one system to the next.

Windage trays can reduce the amount of oil surrounding certain gears, however, currently available windage trays are not optimized to work with certain motors, such as electric-vehicle drive units, in which multiple lubrication paths exist, and are not able to gather metal shavings. A need exists, therefore, for improved apparatuses and lubrication methods to effectively lubricate electric drive units and other power transmission devices.

SUMMARY

Thus, in order to overcome the shortcomings of the prior structures, among other structures, the present disclosure is directed towards an improved windage tray for providing lubrication within an electric drive train and the operation thereof. According to a first embodiment of the present disclosure, a windage tray for a gear box having a first gear and a second gear includes a body, a first tray attached to the body to service the first gear, and a second tray attached to the body to service the second gear. The first tray defines a first bleed hole therethrough to allow oil to enter the first tray and the second tray defines a second bleed hole therethrough to allow oil to enter the second tray. With the body including both the first tray and the second tray, the body services both the first gear and the second gear to limit oil flow onto the first and second gears. Further, because the body includes both the first tray and the second tray, a single structure services both the first and second gears.

According to a first aspect of the first embodiment, the body further may define a magnet slot therein. According to a second aspect of the first embodiment, the windage tray may be made from molded plastic. According to a third aspect of the first embodiment, the windage tray may include a tube having an inside surface and an outside surface, wherein the outside surface of the tube is attached to the first tray. With this third aspect, the tube may define a third bleed hole extending from the inside surface to the outside surface. Further, with this third aspect, the windage tray and the tube may be made from molded plastic using the same mold.

According to a second embodiment of the present disclosure, a gear box includes a housing, a first gear, a second gear, and a windage tray. The windage tray includes a body, a first tray attached to the body to service the first gear, and a second tray attached to the body to service the second gear. The first tray defines a first bleed hole therethrough to allow oil to enter the first tray, the second tray defines a second bleed hole therethrough to allow oil to enter the second tray, the first gear is positioned within the first tray, and the second gear is positioned within the second tray. With the body including both the first tray and the second tray, the body services both the first gear and the second gear to limit oil flow onto the first and second gears. Further, because the body includes both the first tray and the second tray, a single structure services both the first and second gears.

According to a first aspect of the second embodiment, the body further may define a magnet slot therein. According to a second aspect of the second embodiment, the windage tray may be made from molded plastic. According to a third aspect of the second embodiment, the windage tray may include a tube having an inside surface and an outside surface, wherein the outside surface of the tube is attached to the first tray. With this third aspect, the tube may define a third bleed hole extending from the inside surface to the outside surface. Further, with this third aspect, the windage tray and the tube may be made from molded plastic using the same.

According to a fourth aspect of the second embodiment, the gear box includes a differential, wherein the tube is positioned with the third bleed hole directed towards the differential. With this fourth aspect, the windage tray and the tube may be made from molded plastic using the same mold.

According to a fifth aspect of the second embodiment, the gear box may include a differential bearing, wherein the housing defines a drain therethrough from an inner side wall adjacent the first gear, to the differential bearing.

A third embodiment of the present disclosure addresses a method for use in a gear box, the gear box including a housing, a first gear, a second gear, and a windage tray having a body, a first tray attached to the body, and a second tray attached to the body, wherein the first tray defines a first bleed hole therethrough to allow oil to enter the first tray and wherein the second tray defines a second bleed hole therethrough to allow oil to enter the first tray, wherein the first gear is positioned within the first tray, and wherein the second gear is positioned within the second tray. The method of the third embodiment includes the operations of providing oil through the first bleed hole to the first gear and providing the oil through the second bleed hole to the second gear.

According to a first aspect of the third embodiment, the gear box further includes a magnet, wherein the body further defines a magnet slot therein, and wherein the magnet is positioned within the magnet slot and the method further includes removing debris from the oil using the magnet.

According to a second aspect of the third embodiment, the gear box further includes a tube having an inside surface and an outside surface, wherein the outside surface of the tube is attached to the first tray, the method further comprising, providing the oil through the tube.

According to a fourth aspect of the third embodiment, the gear box further includes a differential, and wherein the tube defines a third bleed hole extending from the inside surface to the outside surface and the method further includes spraying oil out of the third bleed hole onto the differential.

According to a fifth aspect of the third embodiment, the gear box further includes a differential and the housing defines a drain therethrough from an inner side wall adjacent the first gear, to the differential bearing.

According to a sixth aspect of the third embodiment, the housing further defines one or more fluid passageways and a drain therein and the method further includes providing the oil through the one or more fluid passageways, under the windage tray, and to the drain.

BRIEF DESCRIPTION OF THE SEVERAL VIEWS OF THE DRAWINGS

FIGS. 3A, 3B and 3C illustrate a side perspective view, side view and top view of a windage tray according to disclosed embodiments.

DETAILED DESCRIPTION OF THE DISCLOSURE

Figure 1A:
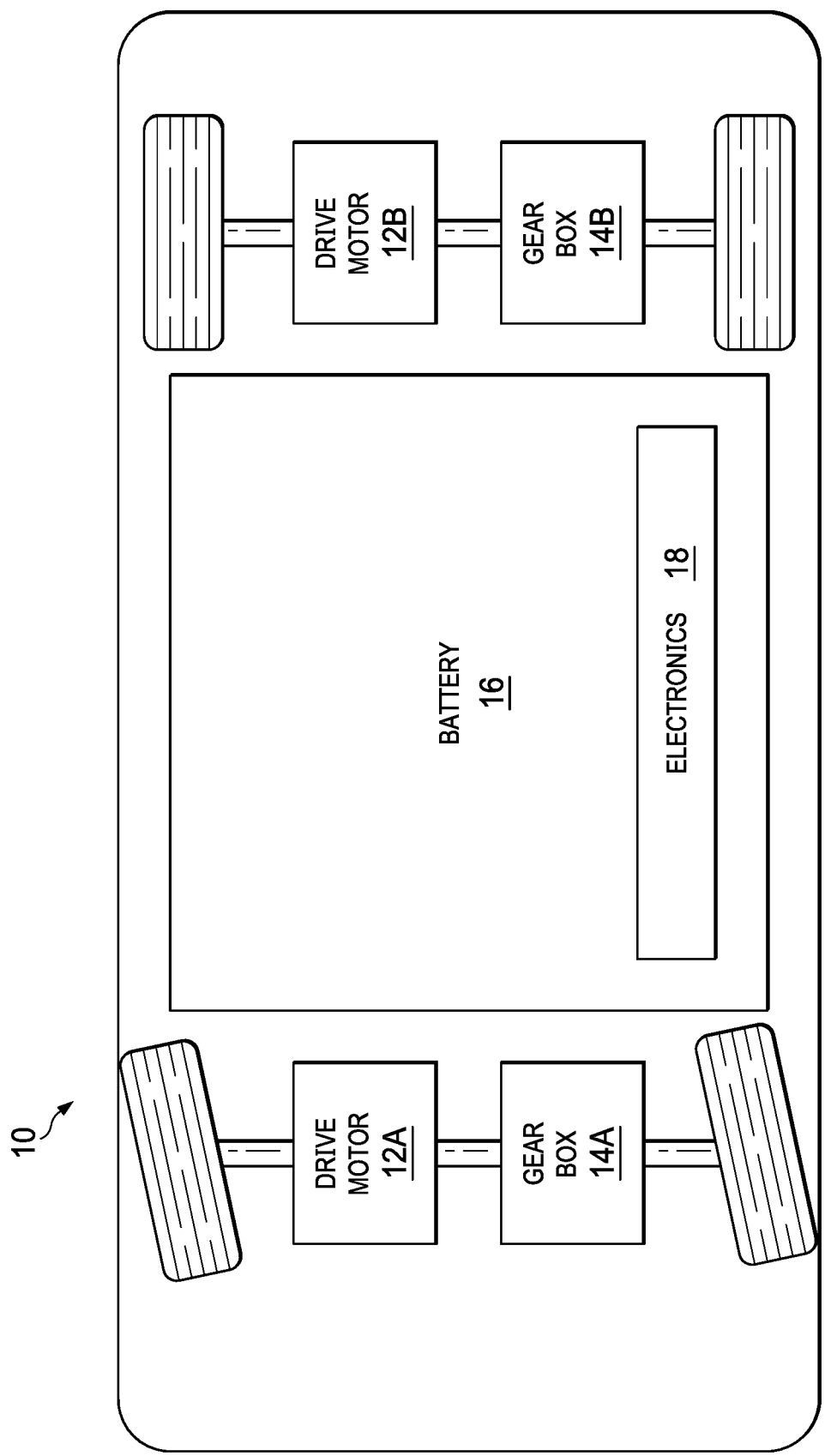
FIG. 1A illustrates the basic components of a battery powered electric vehicle.

FIG. 1A illustrates the basic components of a battery powered electric vehicle (electric vehicle) 10. The electric vehicle 10 includes at least one drive motor (traction motor) 12A and/or 12B, at least one gear box 14A and/or 14B coupled to a corresponding drive motor 12A and/or 12B, a battery 16 and electronics 18 (including drive motor electronics). Generally, the battery 16 provides electricity to the electronics 18 of the electric vehicle 10 and to propel the electric vehicle 10 using the drive motor 12A and/or 12B. The electric vehicle 10 includes a large number of other components that are not described herein but known to one or ordinary skill. While the construct of the electric vehicle 10 of FIG. 1A is shown to have four wheels, differing electric vehicles may have fewer or more than four wheels. Further, differing types of electric vehicles 10 may incorporate the inventive concepts described herein, including motor cycles, aircraft, trucks, boats, train engines, among other types of vehicles.

Various operational issues with the electric vehicle 10 are described herein in conjunction with various embodiments. One of these operational issues relates to the lubrication and cooling of the gear box 14A and/or 14B. Subsequent description herein may relate back to the components of this FIG. 1A. Common numbering may be used to refer to components identified in further FIGs. described herein.

Figure 1B:
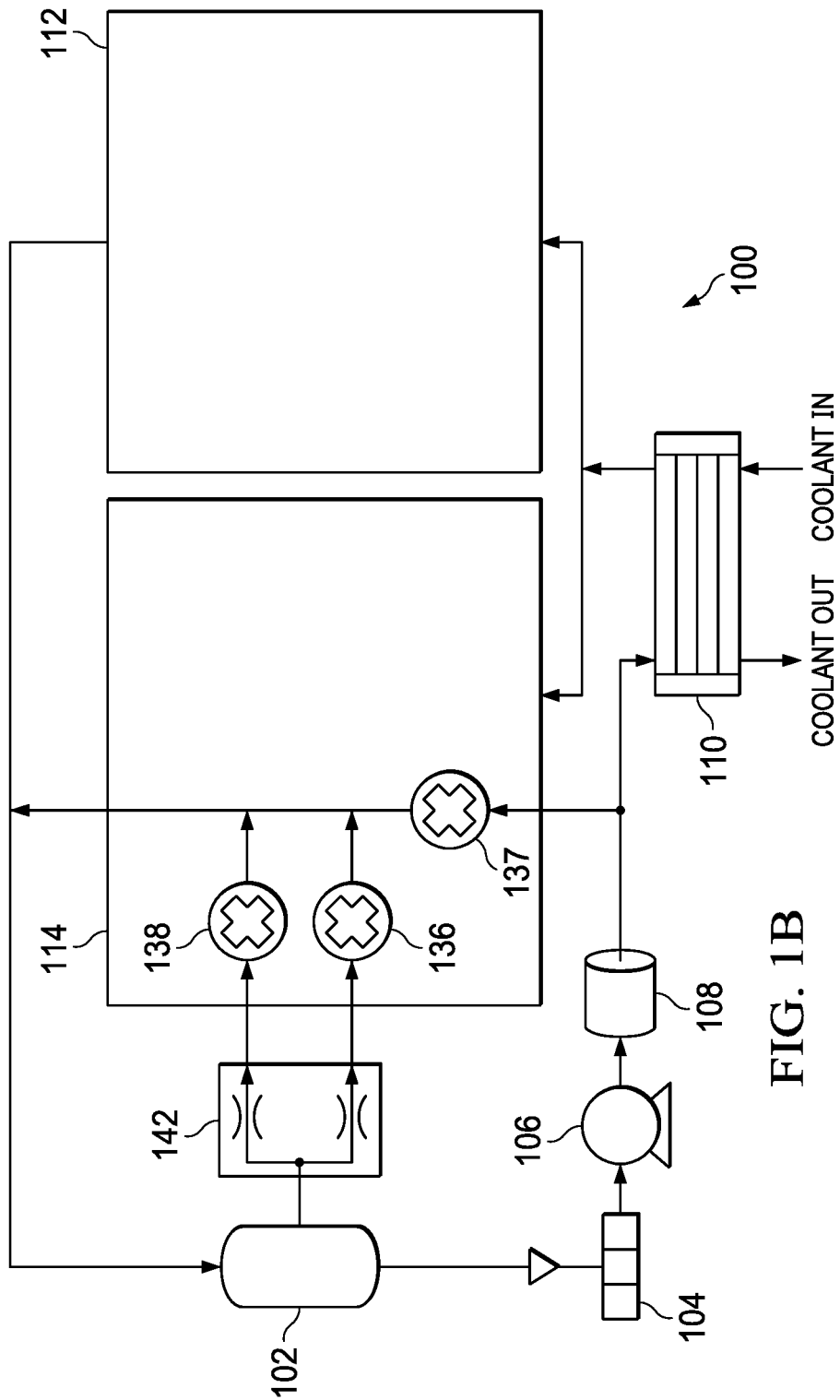
FIG. 1B illustrates a schematic diagram of an oil distribution system according to a disclosed embodiment.

FIG. 1B illustrates a schematic diagram of a cooling and lubrication system 100 according to a disclosed embodiment, which system is used to circulate a fluid, for example oil, though various components of an electric drive unit used in an electric passenger vehicle, for example. Though the embodiments described herein are in the context of a petroleum oil based system, other fluids could be used. For example, any fluid which provides adequate lubrication, heat transfer and flow properties, for a particular application or pump size, could be used. Starting from oil reservoir 102, which could include a sump or dry sump system (e.g. an oil reservoir external to the drive unit), oil flows through meshed filter 104 to electric pump system 106. Oil pumped out of electric pump system 106 then passes through oil filter 108 and into heat exchanger 110. From heat exchanger 110, oil then further splits between a branch that leads to motor 112 and another branch that also leads to gear box 114, with the oil ultimately draining back to oil reservoir 102. Motor 112 could be drive motor 12A or 12B of FIG. 1A. Gear box 114 could be gear box 14A or 14B of FIG. 1A.

Oil from oil reservoir 102, however, may also be used to provide oil to final gear 136, and intermediate gear 138, via windage tray 142. A tube (not shown but described below in greater detail in conjunction with FIG. 5), may also be used to provide oil from oil filter 108 to differential 137. Oil provided to final gear 136, differential 137 and intermediate gear 138 also ultimately drains back to oil reservoir 102. Structure associated with this schematic diagram and a more detailed explanation of the flow of oil therethrough is presented below in conjunction with FIGS. 2-6.

Figure 2A:
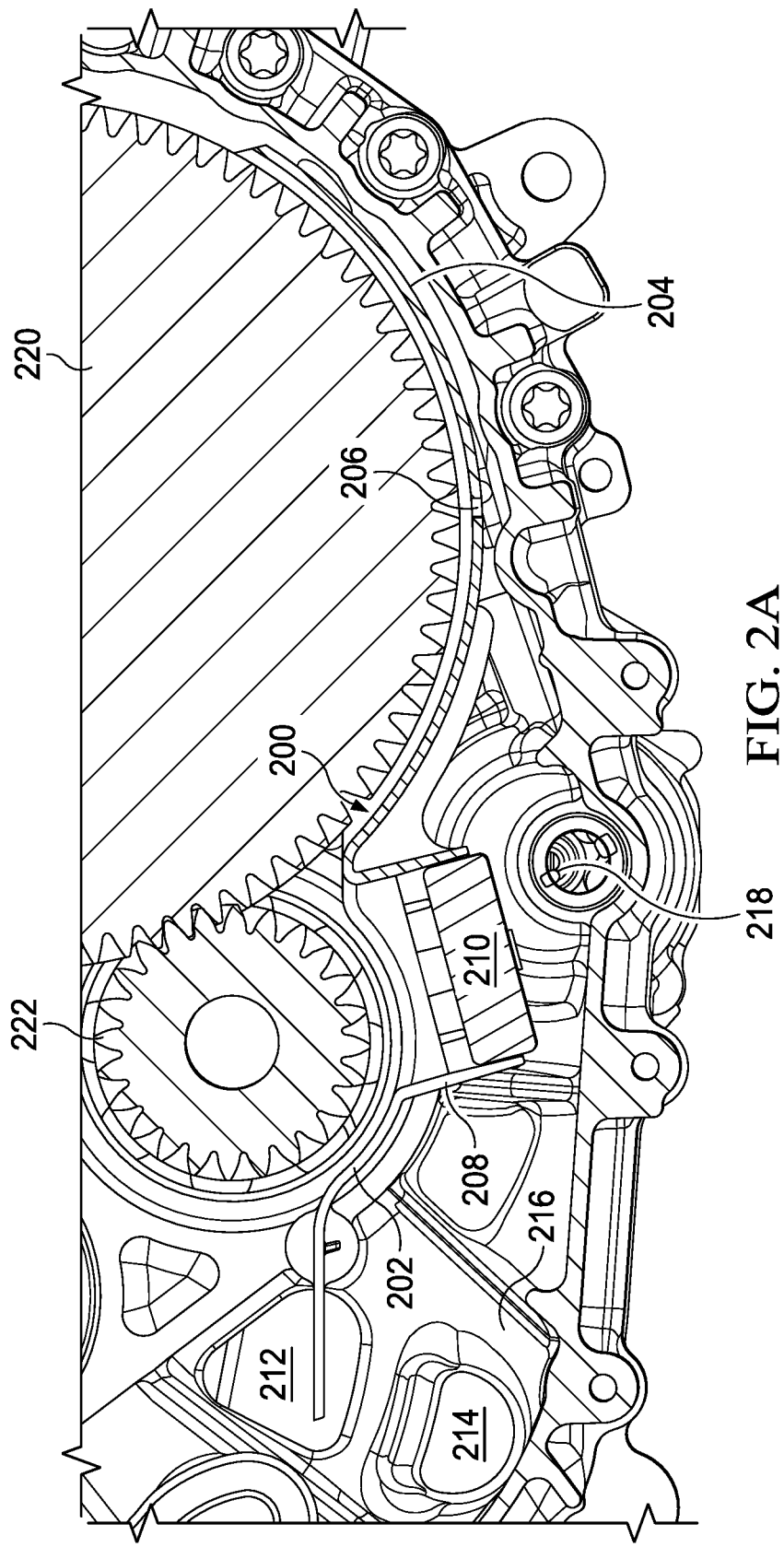
FIGS. 2A and 2B illustrate side sectional views of a gear box, in particular illustrating a windage tray, according to disclosed embodiments.
Figure 2B:
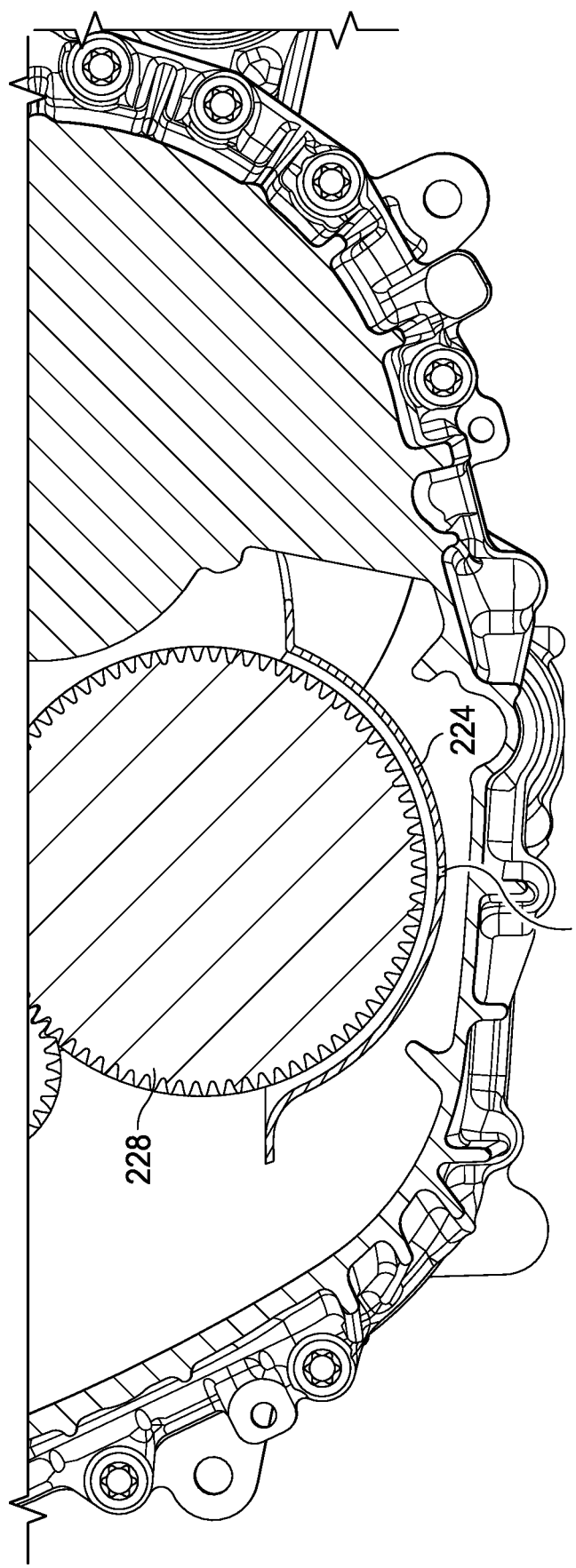
Figure 3B:
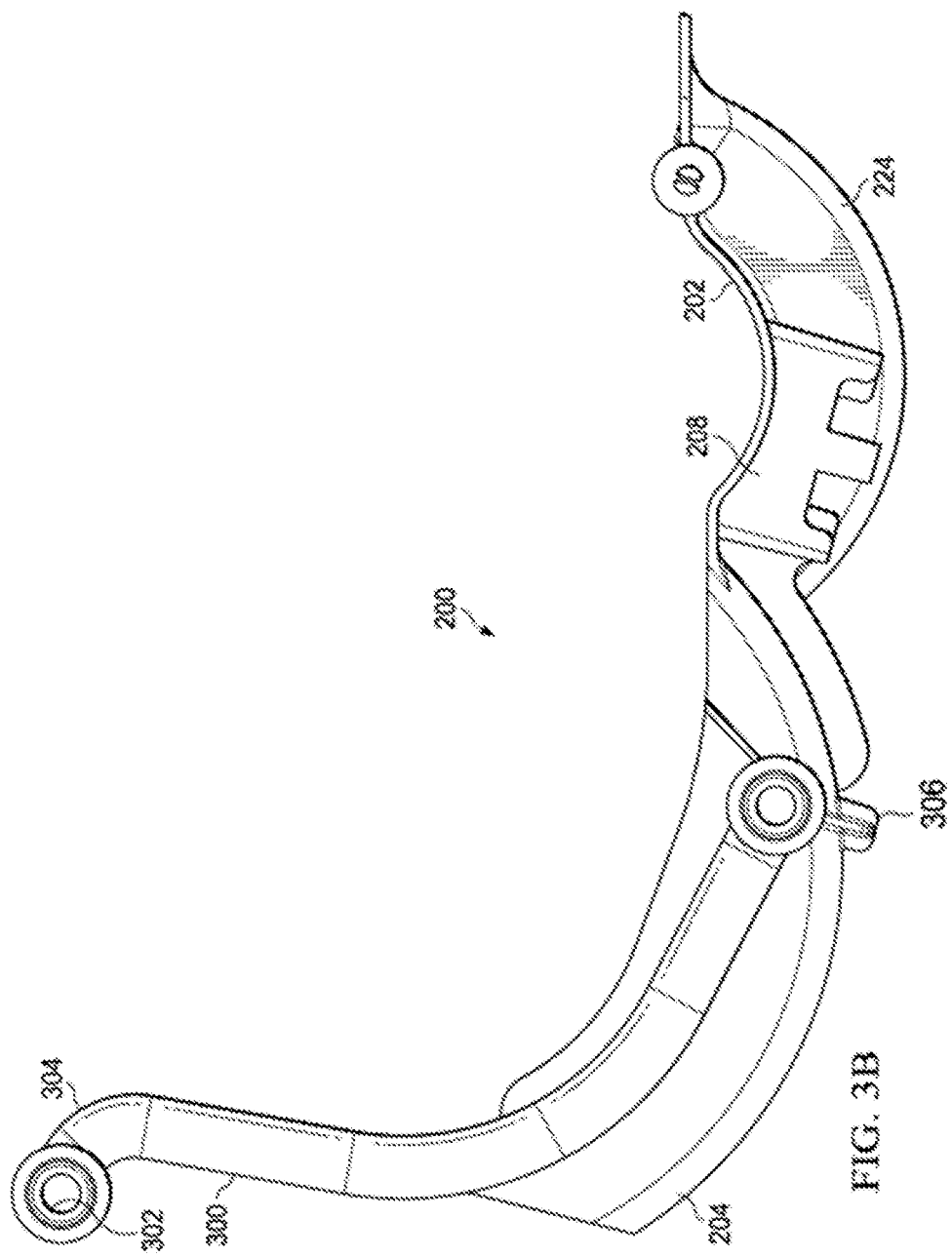

FIGS. 2A and 2B illustrate side sectional views of a gear box, in particular illustrating a windage tray, according to a disclosed embodiment. More specifically, FIG. 2A is a cross section of the gear box at a first depth, while FIG. 2B is a cross section at a second depth. As shown in FIG. 3A, windage tray 200 includes body 202 and a first tray 204 attached to body 202 and having first bleed hole 206 defined therethrough. Also shown is magnet slot 208 defined in body 202, having magnet 210 positioned therein. During operation, oil flows through fluid passageways 212 and 214 in gear box housing 216, below windage tray 200, and to drain 218. One benefit of this arrangement is that together, windage tray 200 and first bleed hole 206, control that amount of oil provided to first gear 220. More specifically, during operation, the rotation of first gear 220 reduces the pressure on the gear side of first tray 204, relative to the non-gear side, so that oil will flow through first bleed hole 206. By controlling the size of the bleed hole one can, therefore, control the amount of oil flowing to the associated gear. According to this disclosed embodiment, oil also flows from the rotor and stator (not shown) past magnet 210 to drain 218, which magnet is positioned near first gear 220, and other gear 222 meshing therewith, so as to collect any metallic debris generated therefrom. FIG. 3B illustrates second tray 224 also attached to body 202 and having second bleed hole 226 defined therethrough, with second gear 228 positioned therein.

One potential benefit of the design of windage tray 200 includes reduced drag loss. More specifically, windage tray 200 avoids first gear 220 and second gear 228 rotating in the oil reservoir, which improves efficiency. This arrangement may also reduce the amount of turbulence and air in the oil reservoir, which may assist an oil pump capturing oil more effectively therefrom.

Figure 3C:
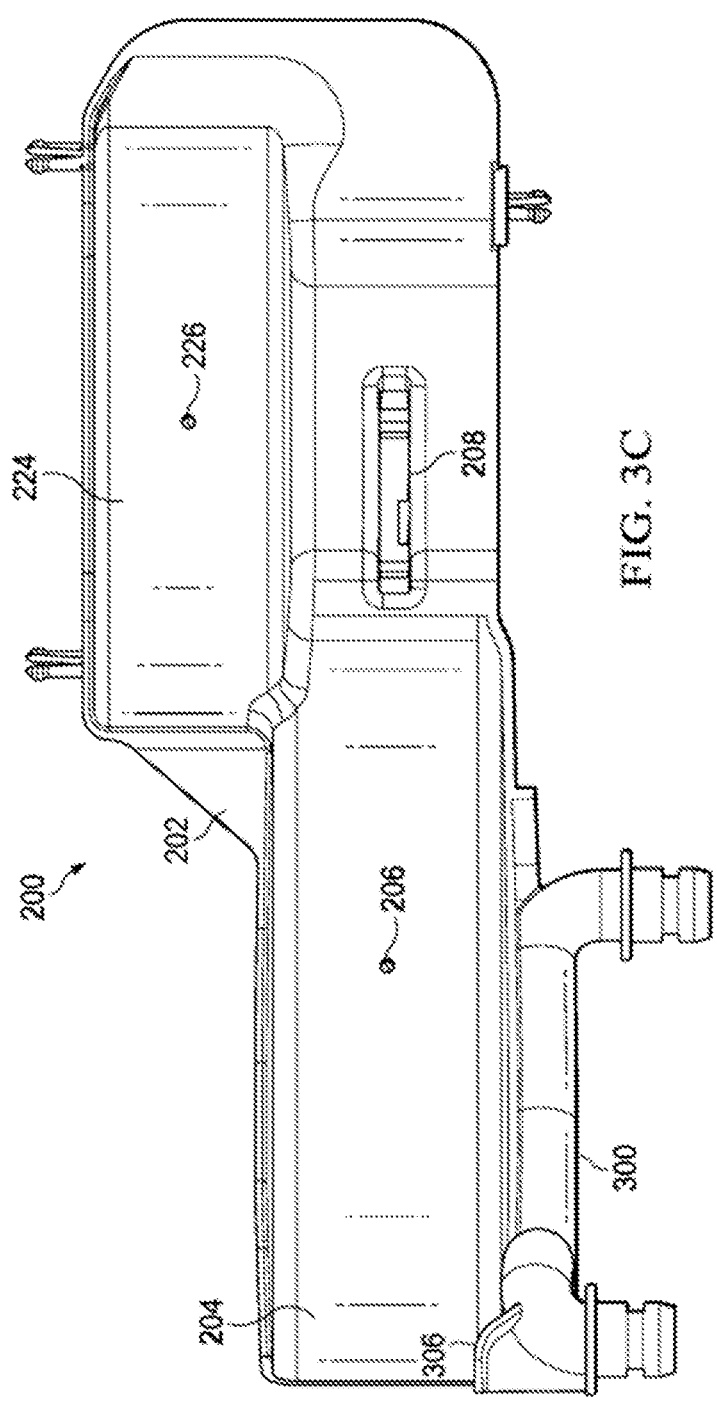

FIGS. 3A, 3B and 3C illustrate a side perspective view, side view and top view of a windage tray according to disclosed embodiments. More specifically, FIGS. 3A, 3B and 3C each illustrate windage tray 200, having body 202 with first tray 204 and second tray 224 attached thereto. Also shown is magnet slot 208 defined in body 202, and tube 300 attached to body 202, to transfer oil from oil filter 108 to heat exchanger 110, for example. Tube 300 includes inside surface 302 and outside surface 304. According to one disclosed embodiment, windage tray 200 may be made from plastic, for example by plastic injection molding. According to another disclosed embodiment, tube 300 may be made in the same mold as windage tray 200, for example by injecting water after a specific amount of time since the plastic for the tube was injected. FIG. 3C illustrates first bleed hole 206 and second bleed hole 226 defined in first tray 204 and second tray 224, respectively.

One potential benefit of having tube 300 be part of windage tray 200 is that it provides flexibility for design packaging and manufacturing. Attaching tube 300 to first tray 204 may also provide additional structural support to each individual element, and may facilitate connecting windage tray 200 to the gear box of an electric drive unit, by providing additional potential attachment points 306.

Figure 4A:
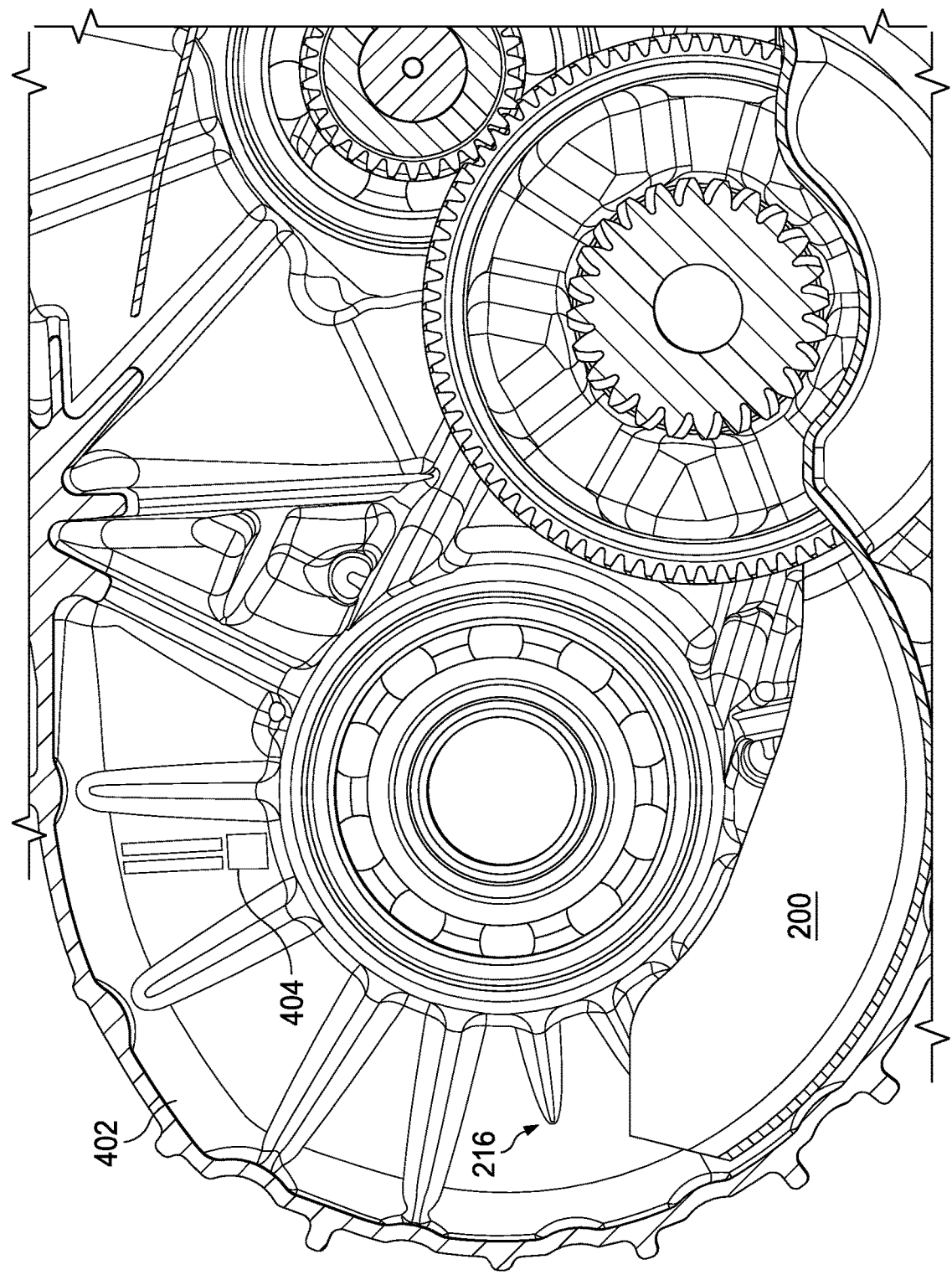
FIGS. 4A and 4B illustrate an end sectional view and a perspective sectional view of a gear box, in particular illustrating differential bearing lubrication, according to a disclosed embodiment.
Figure 4B:
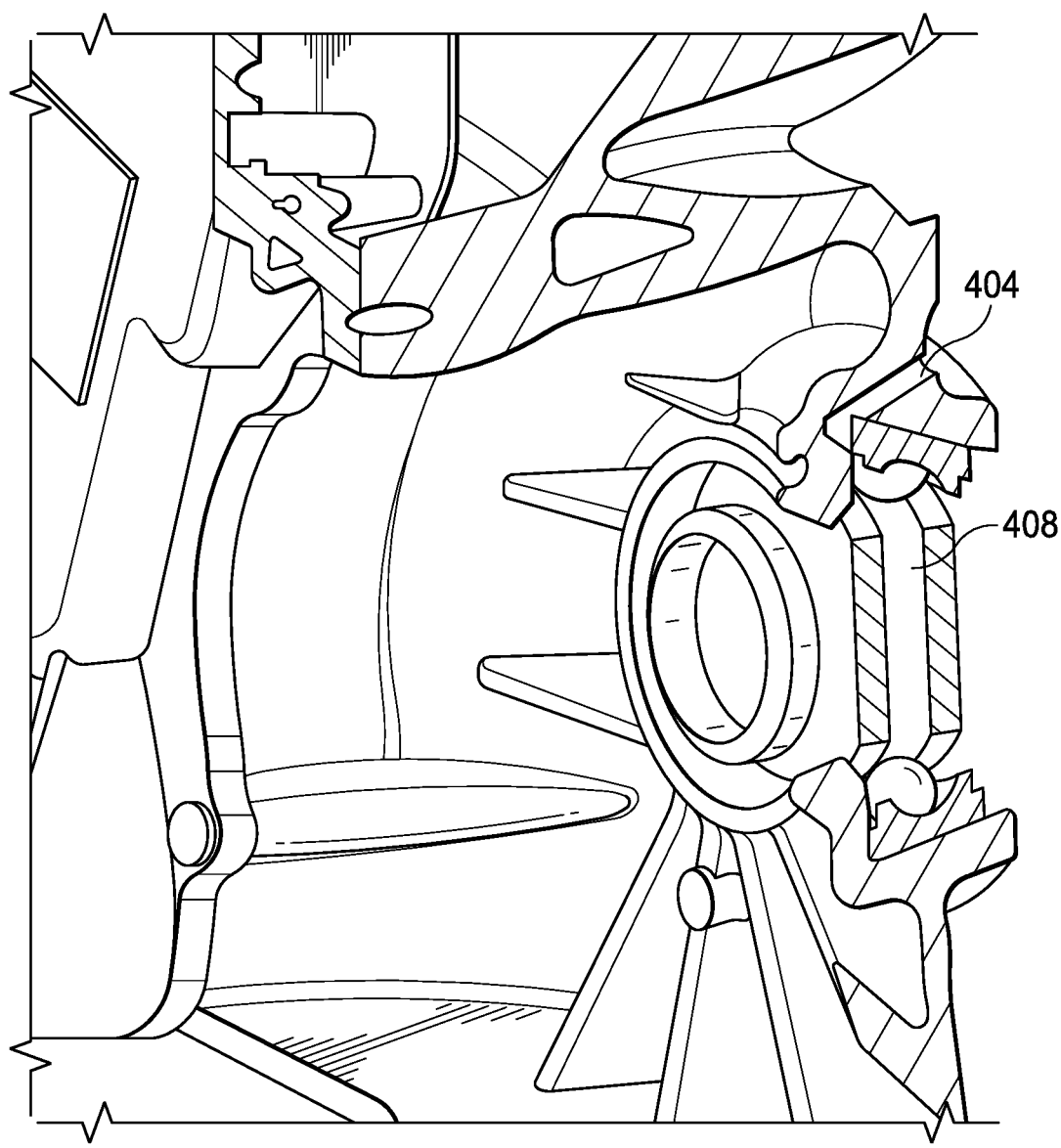

FIGS. 4A and 4B illustrate an end sectional view and a perspective sectional view of a gear box, in particular illustrating differential bearing lubrication according to a disclosed embodiment. More specifically, FIG. 4A illustrates gear box housing 216 generally, having inner side wall 402 with drain 404 defined therein. Also shown is windage tray 200. Oil within windage tray 200 is splashed by final gear (not shown) rotating in gear box housing 216. As shown in FIG. 4B, oil that is splashed into drain 404 drains to differential bearing 408, thereby lubricating the same.

Figure 5:
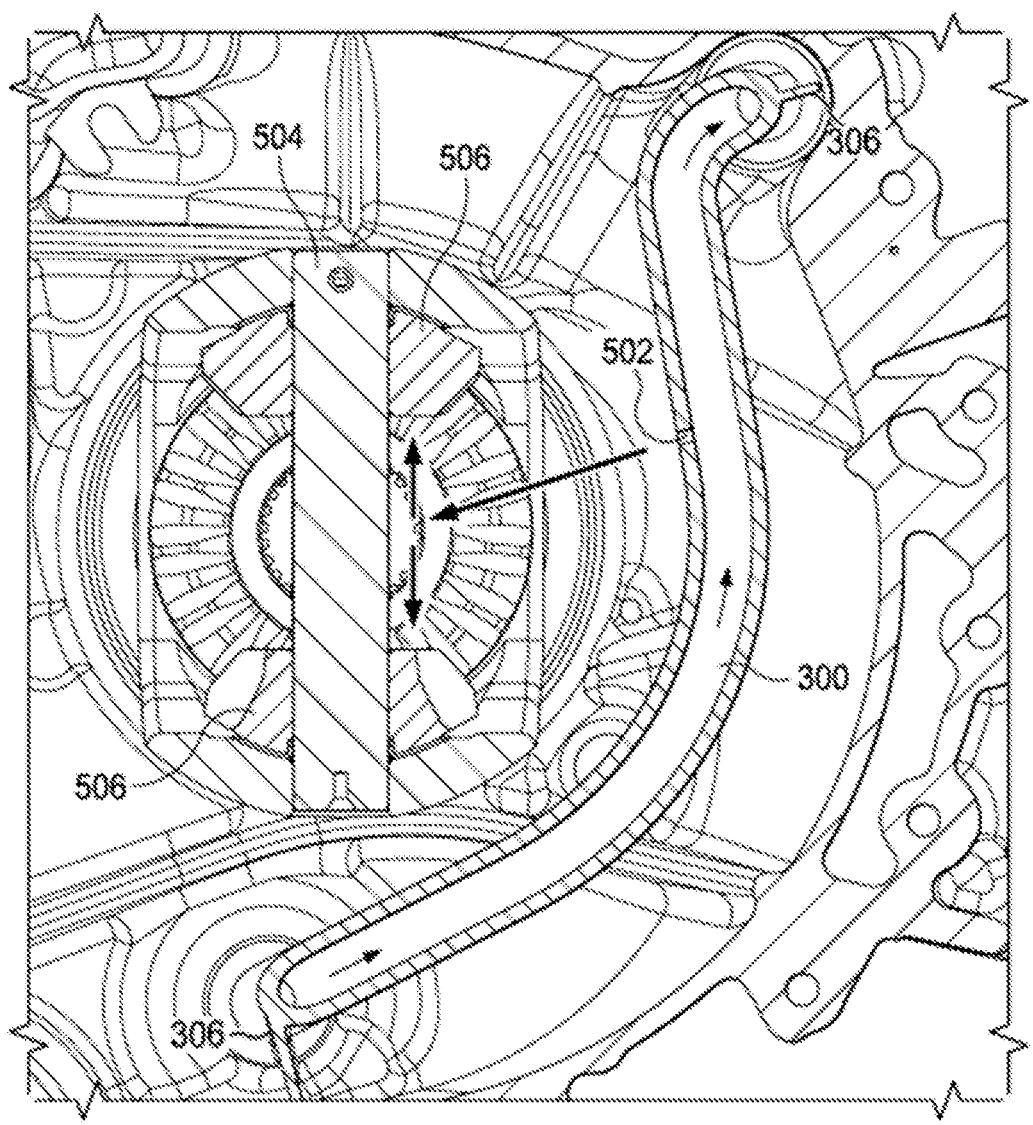
FIG. 5 illustrates an end sectional view of a gear box, in particular illustrating differential lubrication, according to a disclosed embodiment.

FIG. 5 illustrates an end sectional view of a gear box, in particular illustrating differential lubrication, according to a disclosed embodiment. As shown therein, pressurized oil flows through tube 300. By virtue of third bleed hole 502 in tube 300, oil is also jetted, or sprayed, onto the center of the differential's cross pin 504 and thereby lubricating spider gears 506 thereof as a result. During operation, when the differential is turning, the fixed oil jet provides oil to the differential from various angles.

Figure 6:
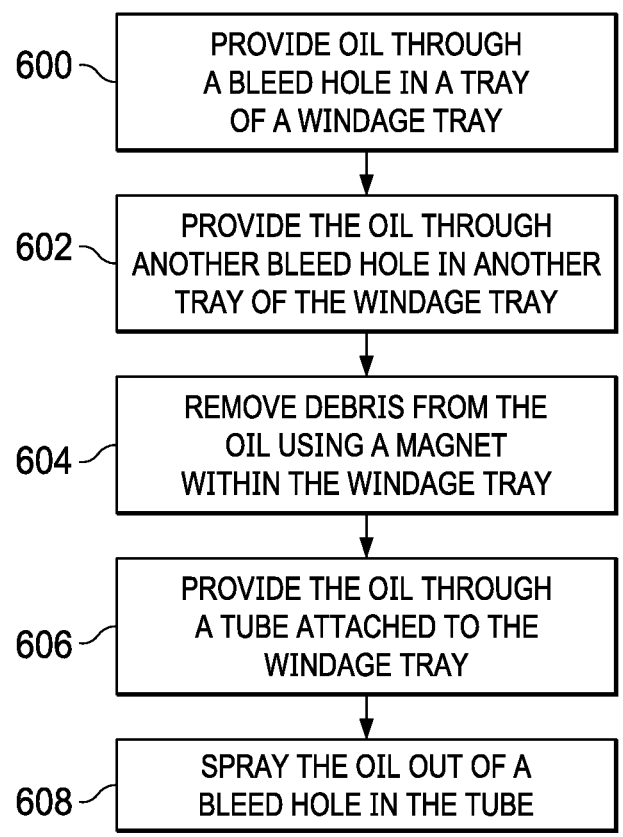
FIG. 6 is a flow diagram illustrating a method for providing oil in a gear box according to a disclosed embodiment.

FIG. 6 is a flow diagram illustrating a method for providing oil in a gear box according to a disclosed embodiment, which method can use the structure and apparatus disclosed above with respect to FIGS. 1-5. Specifically, a first step 600 is to provide oil through a bleed hole (e.g. the first bleed hole) in a tray (e.g. the first tray) of the windage tray. A second step 602 is to provide oil through another bleed hole (e.g. the second bleed hold) in another tray (e.g. the second tray) of the windage tray. An optional third step 604 is to remove debris from the oil using a magnet within the windage tray. An optional fourth step 606 is to provide oil through a tube attached to the windage tray. An optional fifth step 608 is to spray oil is out of a bleed hole in the tube (e.g. the third bleed hole).

In the foregoing specification, the disclosure has been described with reference to specific embodiments. However, as one skilled in the art will appreciate, various embodiments disclosed herein can be modified or otherwise implemented in various other ways without departing from the spirit and scope of the disclosure. Accordingly, this description is to be considered as illustrative and is for the purpose of teaching those skilled in the art the manner of making and using various embodiments of the disclosed system, method, and computer program product. It is to be understood that the forms of disclosure herein shown and described are to be taken as representative embodiments. Equivalent elements, materials, processes or steps may be substituted for those representatively illustrated and described herein. Moreover, certain features of the disclosure may be utilized independently of the use of other features, all as would be apparent to one skilled in the art after having the benefit of this description of the disclosure.

As used herein, the terms "comprises," "comprising," "includes," "including," "has," "having" or any contextual variants thereof, are intended to cover a non-exclusive inclusion. For example, a process, product, article, or apparatus that comprises a list of elements is not necessarily limited to only those elements, but may include other elements not expressly listed or inherent to such process, product, article, or apparatus. Further, unless expressly stated to the contrary, "or" refers to an inclusive or and not to an exclusive or. For example, a condition "A or B" is satisfied by any one of the following: A is true (or present) and B is false (or not present), A is false (or not present) and B is true (or present), and both A and B is true (or present).

Although the steps, operations, or computations may be presented in a specific order, this order may be changed in different embodiments. In some embodiments, to the extent multiple steps are shown as sequential in this specification, some combination of such steps in alternative embodiments may be performed at the same time. The sequence of operations described herein can be interrupted, suspended, reversed, or otherwise controlled by another process.

It will also be appreciated that one or more of the elements depicted in the drawings/figures can also be implemented in a more separated or integrated manner, or even removed or rendered as inoperable in certain cases, as is useful in accordance with a particular application.

What is claimed is:

1. A windage tray for a gear box having a first gear and a second gear, the windage tray comprising:
    a body;
    a first tray attached to the body to service the first gear;
    a second tray attached to the body to service the second gear;
    wherein the first tray defines a first bleed hole therethrough to allow oil to enter the first tray, and
    wherein the second tray defines a second bleed hole therethrough to allow oil to enter the second tray; and
    a tube, wherein the tube comprises a third bleed hole extending from an inside surface of the tube to an outside surface of the tube.

2. The windage tray of claim 1, wherein the body further defines a magnet slot therein.

3. The windage tray of claim 1, wherein the windage tray is made from molded plastic.

4. The windage tray of claim 1, wherein the outside surface of the tube is attached to the first tray.

5. The windage tray of claim 4, wherein the windage tray is attached to the gear box of an electric drive unit by one or more attachment points provided by the tube attached to the first tray.

6. The windage tray of claim 4, wherein the windage tray and the tube are made from molded plastic using the same mold.

7. A gear box comprising:
a housing;
a first gear;
a second gear; and
a windage tray having:
a body:
a first tray attached to the body to service the first gear;
a second tray attached to the body service the second gear,
wherein the first tray defines a first bleed hole therethrough to allow oil to enter the first tray, and wherein the second tray defines a second bleed hole therethrough to allow oil to enter the second tray,
wherein the first gear is positioned within the first tray, and wherein the second gear is positioned within the second tray; and
a tube, wherein the tube comprises a third bleed hole extending from an inside surface of the tube to an outside surface of the tube.

8. The gear box of claim 7, further comprising a magnet, wherein the body further has a magnet slot defined therein, and wherein the magnet is positioned within the magnet slot.

9. The gear box of claim 7, wherein the windage tray is made from molded plastic.

10. The gear box of claim 7, wherein the outside surface of the tube is attached to the first tray.

11. The gear box of claim 7, further comprising a differential, and wherein the tube is positioned with the third bleed hole directed towards the differential.

12. The gear box of claim 10, wherein the windage tray and the tube are made from molded plastic using the same mold.

13. The gear box of claim 7, further comprising a differential bearing, and wherein the housing defines a drain therethrough from an inner side wall adjacent the first gear, to the differential bearing.

14. The gear box of claim 13, wherein the gearbox is configured for lubrication of the differential bearing.

15. A method for use in a gear box of claim 7, the method comprising:
providing oil through the first bleed hole to the first gear; and
providing the oil through the second bleed hole to the second gear.

16. The method of claim 15, wherein the gear box further includes a magnet, wherein the body further defines a magnet slot therein, and wherein the magnet is positioned within the magnet slot, the method further comprising removing debris from the oil using the magnet.

17. The method of claim 15, wherein the outside surface of the tube is attached to the first tray, the method further comprising, providing the oil through the tube.

18. The method of claim 17, wherein the gear box further includes a differential, and the method further comprising spraying oil out of the third bleed hole onto the differential.

19. The method of claim 15, wherein the gear box further includes a differential, and wherein the housing defines a drain therethrough from an inner side wall adjacent the first gear, to the differential bearing.

20. The method of claim 15, wherein the housing further defines one or more fluid passageways and a drain therein, the method comprising:
providing the oil through the one or more fluid passageways, under the windage tray, and to the drain.

* * * * *

UNITED STATES PATENT AND TRADEMARK OFFICE
CERTIFICATE OF CORRECTION

PATENT NO. : 10,781,909 B2  
APPLICATION NO. : 15/944918  
DATED : September 22, 2020  
INVENTOR(S) : Scott Michael Graves et al.

Page 1 of 1

It is certified that error appears in the above-identified patent and that said Letters Patent is hereby corrected as shown below:

On the Title Page

In Column 2, item (74), Attorney, Agent or Firm, Line 1, delete "Martins," and insert --Martens,--.

In the Specification

In Column 4, Line 12 (approx.), delete "FIGs." and insert --FIGS.--.

In the Claims

In Column 7, Line 15 (approx.), Claim 7, after "body" insert --to--.

Signed and Sealed this  
Fifteenth Day of December, 2020

Andrei Iancu  
*Director of the United States Patent and Trademark Office*